Oct. 15, 1935.  M. WAIDE  2,017,190
OPTICAL SYSTEM FOR NATURAL COLOR CINEMATOGRAPHY
Filed March 10, 1933  3 Sheets—Sheet 1
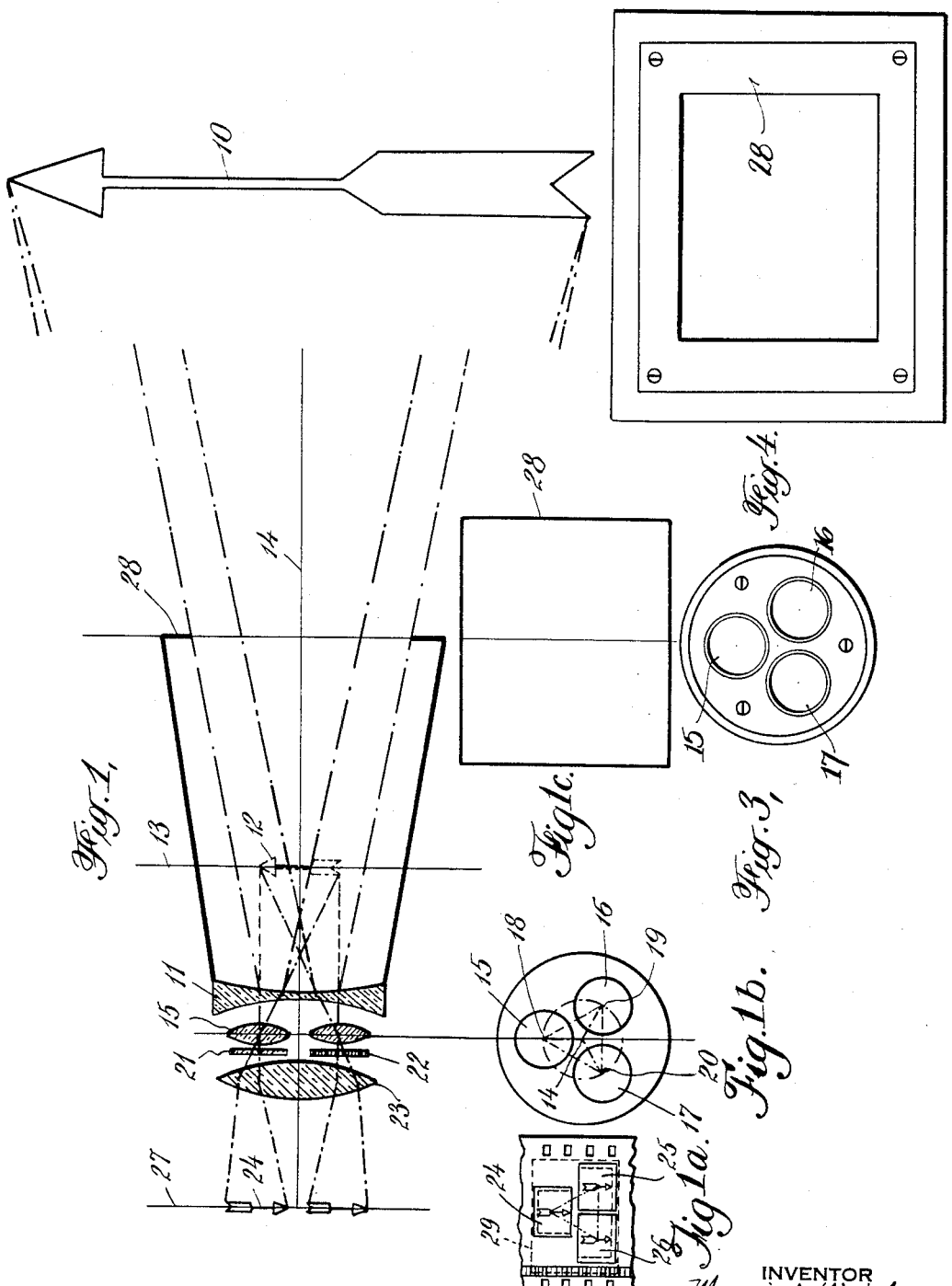

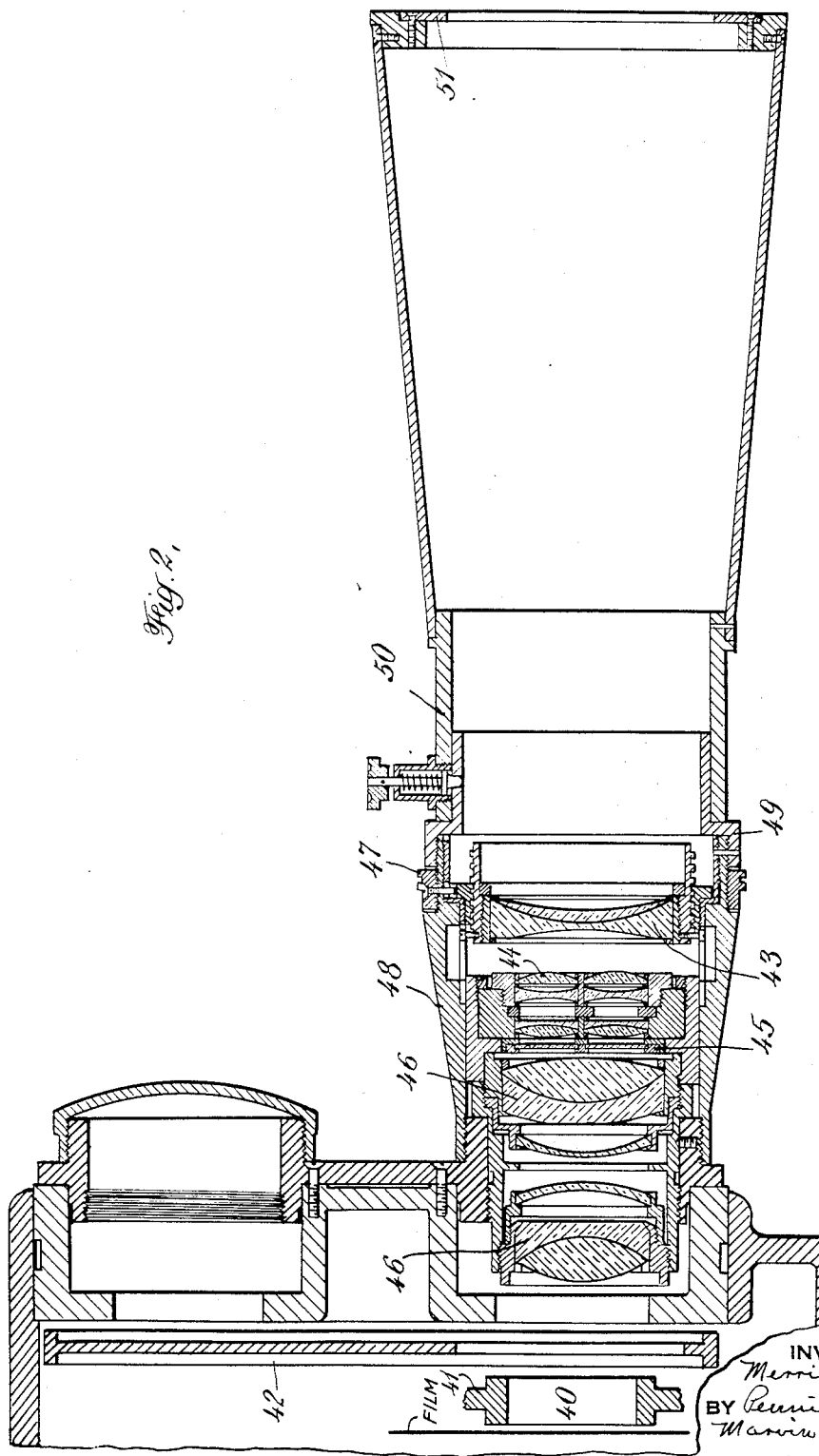

Oct. 15, 1935.    M. WAIDE    2,017,190
OPTICAL SYSTEM FOR NATURAL COLOR CINEMATOGRAPHY
Filed March 10, 1933    3 Sheets-Sheet 3
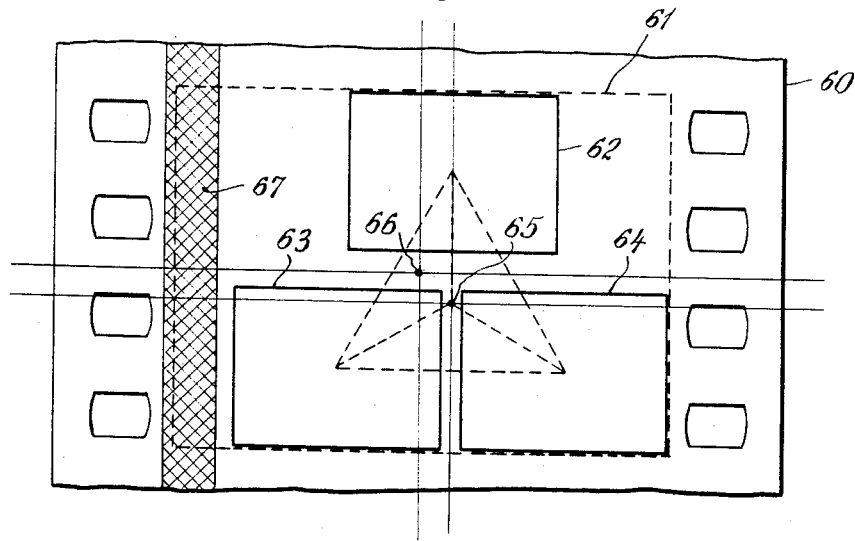
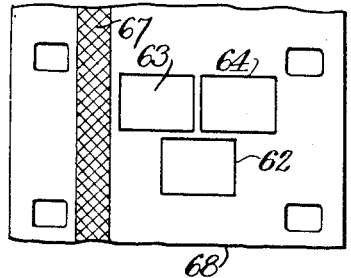   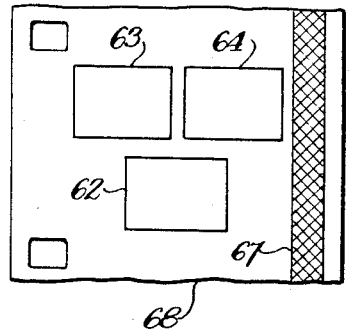
INVENTOR
Merrill Waide
BY
Pennie, Davis, Marvin and Edmonds
ATTORNEYS Patented Oct. 15, 1935

2,017,190

UNITED STATES PATENT OFFICE 2,017,190

OPTICAL SYSTEM FOR NATURAL COLOR CINEMATOGRAPHY

Merrill Waide, New York, N. Y., assignor to Natural-Color Inc., Long Island City, N. Y., a corporation of Delaware Application March 10, 1933, Serial No. 660,201

7 Claims. (Cl. 88—16.4)

The present invention relates to an improved optical system for natural color cinematography.

It has for its particular object the provision of an optical system which, in its preferred form, is readily adapted to be mounted on and used with available standard motion picture camera apparatus employing standard motion picture film, operating either at "silent" or "sound-on-film" speeds.

In accordance with the invention, and utilizing the known technique of the motion picture art, it now becomes practicable to produce simultaneously within the area of the standard fixed dimensions of a standard single frame of a standard motion picture film, and likewise in successive frames, a plurality of separate and distinct juxtaposed non-overlapping geometrically similar monochrome photographic images of like views of objects in an object field of substantial depth. These images are characterized by substantial depth of definition and are without visible parallax within said depth of definition.

With but simple attachments applied to a standard motion picture projector apparatus, and employing standard film which may be printed in any well-known manner from a negative film which has been exposed with my improved optical system and obtained by my method, it now becomes practicable to produce by multi-color additive simultaneous projection (without reliance on persistence of vision for color effects) color motion pictures without undesirable color fringing. The pictures, as viewed upon a theatre screen even of large dimensions, appear in simulation of the true and natural hues of the original objects and subjects and are characterized by substantial depth of definition and without visible parallax within said depth of definition.

To these ends, in accordance with the invention, an optical system is provided, a portion of which is arranged in a manner somewhat similar to that disclosed in U. S. Patent No. 1,124,253 of Audibert. The Audibert system may be generally described as an optical array in which an anterior or front negative lens is employed for producing a virtual image of the object field, with a plurality of positive lenses in coplanar relationship disposed to the rear of the negative lens. And the positive lenses, each cooperating with a suitable chromatic filter, serve to form a plurality of monochrome coplanar real images of the virtual image on a sensitized surface, as described in the patent.

In accordance with the present invention, an anterior negative lens is employed in much the same manner, and generally for the same purpose as taught by Audibert, except that the hereinafter described optical relationships are provided and maintained between the negative lens and the other lenses of my improved system. Like Audibert, I also provide a plurality of coplanar positive lenses disposed to the rear of the anterior negative lens. But I depart from Audibert in choice of focal length and apertures for these lenses and in their mutual arrangement, and also in the optical relationships between these lenses and others of my improved system. Other departures from the teachings of Audibert and improvements thereon will be apparent upon consideration of the following description: First, I modify the general arrangement of the Audibert system so as to provide an additional positive lens arranged to the rear of the coplanar lenses, which positive lens is optically common to the coplanar lenses. This added positive lens is adapted to converge concurrently all of the separate groups of rays established by the coplanar positive lenses respectively, so that a plurality of separate selectively chromatically filtered non-overlapping juxtaposed geometrically similar monochrome real images are produced in a common plane. In addition, and in accordance with the invention, each of the plurality of coplanar real images so produced have like contours and proportional object dimensions, and are separately and distinctly formed in non-overlapping relationship within the standard fixed dimensions of a standard single frame of a standard motion picture film, and with sufficient allowance for a sound-on-film record track.

Briefly, the optical array and system of this invention may be generally described as follows: A negative anterior lens; a coplanar trefoil of like positive lenses; and a posterior positive lens optically common to the trefoil lenses. In front of this array is arranged a mask for limiting the object field and delineating a portion thereof. The ultimate purpose of the delineator is to prevent overlapping of the images as separately formed in juxtaposed relation in the image plane of the system, within the area of the fixed dimensions of a standard single frame of a standard motion picture film.

With this arrangement, I am enabled to successfully practice the method of natural color cinematography of objects in an object field of substantial depth which comprises, delineating the object field; diverging rays reflected from the entirety of said delineated portion of the object field to form a virtual image thereof; separately establishing and simultaneously converging a plurality of separate groups of rays, all of which are taken up from said virtual image, each group consisting of rays initially reflected from the said portion of the object field; separately and selectively chromatically filtering all of the rays of each of said separate groups of rays; concurrently converging all of the rays of said chromatically filtered separate groups of rays, to form a plurality of separate juxtaposed non-overlapping geometrically similar monochromatic real images in a common plane; and producing a monochromatic photograph of each of said real images in said common plane; whereby the said monochromatic photographs of objects in an object field of substantial depth have substantial depth of definition, and parallax is substantially minimized within said depth of definition.

The function of the anterior negative lens, and its relation to my improved system, is to form a virtual image of that portion of the object field as limited by the delineator or mask. In the formation of such a virtual image, the depth of the object field is compressed axially to such an extent that the several planes of the object field appear in substantially like relation. This minimizes parallax to such an extent that it is not apparent or visible within the depth of field of the system.

The arrangement and function of the trefoil of like positive objective lenses (for tri-color additive cinematography) will now be described. These positive lenses are arranged to the rear of the negative lens in trefoil coplanar relationship, with their axes mutually equidistant and parallel. They serve to separately and simultaneously converge each of the separate groups of rays appearing to emanate from the virtual image produced by the anterior negative lens, of that portion of the object field as limited by the size and contour of the delineator opening. Each of these separate groups of rays is then subjected to the action of suitably chosen chromatic filters.

The posterior positive lens, in accordance with the invention, is preferably arranged so that its anterior surface is closely adjacent the plane of the posterior surfaces of the positive objectives of the trefoil, and preferably with its axis centrally located with respect to the axes of the objectives of the trefoil. By axially moving the posterior positive lens more closely to or farther from the trefoil, the distance may be altered between the juxtaposed but separate and distinct multiple real images produced in the focal plane at the surface of the film. This axial movement also alters the focal length of the entire system, for the reason that the posterior positive lens is part, together with each of the plurality of objectives of the trefoil, of a converging lens combination having the virtual image of the negative lens and the focal plane containing the film conjugate to each other.

Thus, the common posterior positive lens performs the following functions, among others: It converges, relative to each other, the separate groups of selectively chromatically filtered rays forming the three real images at the image plane so that they impinge the sensitized surface of the film within an area required for standard motion picture practice, i. e., within the limited dimensions of what is generally referred to as a standard single motion picture film frame. Furthermore, the positive lens functions as a part of the converging system which forms the three real images and thus it is an important factor affecting the size of each of the real images, and in making them of sufficiently small dimensions to be formed and contained within the area required for modern "silent" film or "sound-on-film" motion picture practice.

And the common posterior positive lens, functioning as part of the converging power, minimizes visible parallax for the degree of convergence which it furnishes, since it functions as any single objective by affecting the definition rather than the placement of objects at various planes in the object field.

On account of the size of the beam produced by the anterior negative lens, if the posterior positive lens were not employed in the optical system of this invention, the entire multiple image-forming function would have to be performed solely by the positive objectives of the trefoil. Thus, each of these objectives would have to be of short focal length and comparatively small actual aperture, thereby very materially reducing the luminosity so necessary in modern motion picture photography.

As my improved system functions, it may be said that an object and the virtual image thereof are conjugate with relation to the anterior negative lens. The rays which seem to emanate from this virtual image are next separately converged by each of the objectives of the trefoil and finally concurrently converged still more by the common posterior positive lens, so as to form three images on the motion picture film frame at the image plane of the system, the virtual image and the plane of the film being in planes conjugate to the combination of each of the trefoil objectives and the posterior positive element. Thus, a delineator having a rectangular opening of suitable dimensions, placed in front of the entire optical system and at a proper distance from the front surface of the negative lens, may be arranged to prevent any rays of the three real images overlapping at the image plane and, in addition, to avoid the cutting off of any desired rays.

Now, it is well known in the photographic art that objects in planes at relatively large different distances from an objective will be imaged with varying definition in the focal plane. It is also commonly known that lack of definition of images of objects in any given plane, when those located in another plane are well defined, is caused by the size of the cone of light proceeding to or from the point of definition, the size of the cone depending partly for a given objective upon the distance of the point of definition from that of the focal plane used. It will therefore be understood that only a single plane of the object field can be perfectly defined at one time, and the degree of acceptibility of definition of objects in any other plane is determined by the circle of confusion permitted for a given use of the image. Furthermore, it is well known that the shorter the focal length, the greater the depth of field and the smaller the circle of confusion, with other conditions equal. Therefore, if a plurality of objectives of comparatively short focal length are employed simultaneously to photograph the same object field, the resulting effect of parallax will be much greater than if such objectives were of longer focal length.

Now, if the converging effect of a short focal length is retained without requiring the use of short focal length objectives, it is possible to avoid the disagreeable results caused by parallax to a degree relative to the avoidance of a short focal length for the objectives per se. Thus, by using a posterior positive lens common to all of the plurality of objectives to obtain converging power, and which results in the usual circle of confusion, rather than of displacement, we have, for all practical ends, accomplished the desired purpose. If enough converging power is placed in the common posterior positive lens so that what will be termed "the depth of object field with minimum objectionable parallax" is always sufficient for the depth of field for definition, it is possible to produce three coplanar real images which are geometrically alike for a given method of observation.

Thus, with focal lengths which will be hereinafter described, geometrically alike film images may be secured for tri-color additive simultaneous projection as color motion pictures, using standard apparatus and operating within the accepted practices of the modern motion picture art, and with the object field being limited in depth with reference to the focal length of the lens system selected for use.

An advantage of the optical system designed and arranged in accordance with this invention is the facility with which duplicate lenses may be manufactured in quantity and yet, with each of which, images may be secured similarly spaced on a standard film. Thus, in the event of inaccuracies occurring in production as the result of quantity manufacture, the axial spacing should vary or the focal lengths of either the trefoil objectives or the posterior positive should vary, the small differences may be compensated for by axial adjustment.

Another advantage inherent in the improved optical system of this invention is that optical systems of several equivalent focal lengths may be readily assembled by employing different anterior negative lenses of varied focal lengths without requiring any change of the other elements of the system.

To enable the use of my improved optical system and method with standard motion picture film with provision for a sound-on-film record track thereon, for the production of so-called "talking" color motion pictures, the common axis of symmetry of the entire optical system may be displaced horizontally relative to the geometric center of the picture aperture of the camera aperture plate (which outlines a film frame) by an amount equal to one-half the width of a standard sound track. And, for the purpose of obtaining maximum use of the area of the three photographic images within the limited dimensions of a single frame of a standard motion picture film, the common axis of the optical system may be displaced vertically relative to the geometric center of the picture aperture of the camera aperture plate, by an amount equal to the distance between a point representing the geometric center thereof and a point representing the geometric center of the three real images produced at the focal plane on the film. In other words, if one point be taken equidistant from the centers of the three images on the film, and another point be taken which is the geometric center of a standard single motion picture film frame, the distance between these two points will determine the required vertical displacement of the axis of the optical system. For the purpose of conveniently obtaining the vertical and horizontal displacements specified, the entire optical system (and its common axis of symmetry) is mechanically displaced diagonally and to an extent which accomplishes at once both the desired vertical and horizontal displacements.

With the axis of the optical system arranged as above described with respect to the geometric center of the picture aperture in the aperture plate, a motion picture film for multi-color additive simultaneous projection is obtained in accordance with the invention, which may comprise a standard continuous film of standard width, having within the area of the standard fixed dimensions of a single motion picture film frame thereof, and likewise in successive frames, a plurality of separate geometrically similar monochrome photographic images of like views of objects in an object field of substantial depth, distinctly formed in juxtaposed non-overlapping relation. Each of the images will be characterized by substantial depth of definition and without visible parallax within said depth of definition.

These photographic images, however, will be arranged symmetrically about a center within the film frame, which is eccentrically located with respect to, or displaced from, the geometric center of what, in the usual film frame, would be the geometric center of the picture and the standard frame. And a continuous sound track record may be provided thereon longitudinally of the film and adjacent the successive frames.

Thus, in the case of so-called "news reel" sound-film motion picture cameras provided with an optical system in accordance with this invention, provision is made for recording simultaneously the motion picture action and a sound-on-film record. In the case of studio cameras, the action and sound are recorded separately; nevertheless my improved system and method provides sufficient space on the negative film for a sound record track on the ultimate positive film employed for projection. Such a film is usually produced by simultaneously optically printing from the picture negative and a separate film containing the sound record, directly to positive film stock.

For a complete understanding of a preferred embodiment of the invention, and as well a manner of practicing the method thereof, reference may be had to the drawings and the following description.

In the drawings:

Fig. 1 is a schematic optical diagram illustrating the lens array of the system and the formation of both the virtual image and the plurality of real images;

Fig. 1a is a face view of the film 27 shown edgewise in Fig. 1;

Fig. 1b is a front view of the trefoil 15 of Fig. 1;

Fig. 1c is a front view of the delineator 28 of Fig. 1:

Fig. 2 is a sectional view of the improved optical system suitably mounted and arranged on the turret of a camera of standard make;

Fig. 3 shows the manner of arranging and mounting the plurality of positive lenses in trefoil relation;

Fig. 4 is a front view of the mask or delineator;

Fig. 5 is an enlarged view of a section of a continuous standard 35 mm. width film in accordance with the invention, showing a single frame thereof with a sound record track provided thereon;

Fig. 6 is an enlarged view of a section of a continuous standard 16 mm. width film in accordance with the invention—of the double row of sprocket holes type; and Fig. 7 is an enlarged view of a section of a continuous standard 16 mm. width film in accordance with the invention—of the single row of sprocket holes type.

Referring now to Fig. 1, assume an object, such as an arrow 10, at some finite distance from the negative lens 11. A virtual image of the object 10 will then be formed at 12 in a plane 13 about the axis 14 of the negative lens 11, as is well understood, since the negative lens 11 diverges the rays reflected from the entirety of the object 10.

To the rear of the negative lens 11, there is arranged a trefoil of positive lenses 15, 16, 17, in coplanar relationship, each of like converging power, with their respective axes 18, 19, 20, mutually equidistant and parallel to the axis 14 of the negative lens 11. These lenses each take up the virtual image 12 and establish simultaneously a plurality of separate groups of rays, each group consisting of rays initially reflected from the entirety of the object 10.

Associated with each of the positive lenses 15, 16 and 17, is a suitably chosen chromatic filter as indicated at 21 and 22. The three filters are preferably red, green and blue respectively, and of such characteristics as to form a tri-color set of additive photographing filters, for example, those of Eastman Wratten, well known in the art.

Immediately adjacent the filters, but in the rear thereof and hence closely adjacent the plane of the posterior surfaces of the trefoil positive lenses 15, 16 and 17, there is arranged a positive lens 23, the axis of which coincides with the axis 14 of the negative lens. This positive lens 23 is of such diameter as to be optically common to each and all of the positive lenses 15, 16, and 17. The converging power of the lens 23 is of the order of that of the positive lenses (i. e., within the order of 1 to 10), and it serves to converge relative to each other, all of the rays of the chromatically filtered separate groups of rays established by the positive lenses 15, 16 and 17 in conjunction with their respective associated filters. Thus, the lens 23, together with each of the positive lenses 15, 16, and 17, may be said to form a converging lens combination.

The most important function performed by the posterior positive lens 23 is that of converging relative to each other the three separate groups of rays, established simultaneously by the three positive lenses 15, 16, and 17 respectively, to form three real images (indicated at 24, 25, and 26) at the focal or image plane of the camera and system, and in which is included the sensitized surface of the film, and further, to form these images so that they impinge the sensitized surface of the film in the plane 27 within the area 29 of the standard fixed dimensions of a standard single frame thereof.

As will be observed, the optical array, including the negative lens 11, the trefoil lenses 15, 16, and 17, and the posterior positive lens 23, is provided with a mask or delineator 28 arranged in front thereof for limiting the object field and delineating a portion thereof. The ultimate purpose of the delineator 28 is to prevent overlapping of the images 24, 25, and 26, as separately formed in juxtaposed relation in the image plane 27 of the system, within the area of the standard fixed dimensions of a standard single frame of a standard motion picture film, as outlined at 29.

It is to be understood that Fig. 1 is merely a schematic optical diagram and that, as pointed out hereinbefore, optical systems of several equivalent focal lengths may be readily assembled by employing different negative lenses at 11 of varied focal lengths. This does not require any change in the mutual arrangement or placement of the other elements of the system, i. e., the trefoil lenses 15, 16, and 17 and the posterior positive lens 23.

Referring now to Fig. 2, which is in part a vertical section and in part a rotated section, for the purposes of symmetrical illustration, I have shown my improved optical system mounted and arranged on the turret of a standard professional Bell and Howell motion picture camera for 35 mm. film.

In Fig. 2 the camera picture aperture 40 is shown arranged in the usual manner in the aperture plate 41. As is well known, the purpose of the picture aperture is to outline an area on the film at each exposure, which area is of certain fixed standard dimensions. The camera shutter is shown at 42.

For the purpose of enabling those skilled in the art to construct and utilize my improvements and practice the method described herein, I wish to specifically point out, by reference to Fig. 2, that 43 illustrates a Carl Zeiss Tele-Negative lens having a 7.5 cm. focus, so mounted as to permit of a three-eighths inch axial movement for focusing. This lens is quite suitable for close-ups, but for medium long shots and long shots, 6 cm. and 4.5 cm. focus like lenses, respectively, should be employed.

To the rear of the negative lens 43 there is arranged a trefoil 44 of three like Zeiss Tessars f4.5 having a focus of 6.5 cm. These lenses are symmetrically mounted in coplanar relationship about the axis of the negative lens 43, with their respective axes mutually equidistant and parallel. An axial separation of 0.551 inches has been found to be satisfactory. A front view of the manner of arranging and mounting the positive lenses of the trefoil is shown in Fig. 3.

Immediately adjacent the posterior surface of the trefoil positives, there is arranged a filter holder 45 for three filters, one for each of the three lenses of the trefoil 44. These filters are chosen so as to have the proper characteristics to form a tri-color set of additive photographing filters and may be Eastman Wratten filters or the like.

Immediately adjacent the posterior surface of the filters at 46, a Hugo Meyer, Kino-Plasmat f1.5 lens of 5 cm. focus is provided.

As will be noted, the trefoil lenses 44 and the posterior positive lens 46 are fixedly mounted. No adjustment of these lenses is required at any time by the motion picture camera photographer.

The proper focusing adjustment of the negative lens 43 and of the system may be had by turning the knurled ring 47 on the focusing mount holder 48. This produces an axial movement of the lens 43.

The mount 49 serves to support the delineator holder 50, and a delineator 51 is in turn supported thereby. A suitable delineator for the optical system just described is one placed at approximately 7½ inches from the anterior surface of the negative lens 43 and having a rectangular opening $2\frac{1}{16}$ by $1\frac{23}{32}$ inches. A front view of the delineator showing the opening is illustrated in Fig. 4.

Referring now to Fig. 5, 60 is a portion or section of a continuous standard 35 mm. width film in accordance with the invention, having within the area indicated by dotted lines 61, which outline the standard fixed dimensions of a standard single frame, a plurality of separate geometrically similar monochrome photographic images 62, 63, and 64, of like views of objects in an object field of substantial depth. It is, of course, to be understood that it is impossible to illustrate photographic images of this character in drawings, but suffice to say that such images are produced in accordance with the invention, distinctly formed in juxtaposed non-overlapping relation, and are characterized by substantial depth of definition, without visible parallax within said depth of definition.

The point 65 indicates a center within the standard frame 61, about which the photographic images 62, 63, 64, are symmetrically disposed. This center is displaced from, or eccentrically disposed with respect to, the geometric center 66 of the standard film frame 61, to enable the provision of a sound-on-film record track 67 adjacent the images 62, 63, 64, of the single frame, and likewise adjacent successive frames. The vertical displacement of the center 65 from the geometric center 66 of the standard film frame also enables maximum use to be made of the three photographic images 62, 63, and 64, formed within the limited dimensions of the frame 61. As will be understood, the images in successive frames are arranged in like relation and are characterized as described above.

Fig. 5 may be considered to represent schematically either a negative film, such as that which would be produced with a so-called "news reel" sound-film motion picture camera, or it may be considered to represent a film of positive stock produced by simultaneous optical printing from a picture negative and a separate film containing the sound record.

Figs. 6 and 7 illustrate standard 16 mm. width continuous film sections or portions 68 which may be obtained directly by means of an optical system in accordance with the invention, designed for use on 16 mm. motion picture cameras, or as illustrating respectively 16 mm. width film with double and single sprocket holes obtained by printing in a so-called "reduction printer" directly from a sound-on-film motion picture film of standard 35 mm. width. In the case of Fig. 6, both the three photographic images and sound-on-film record track are reduced in the same ratio by the reduction printer. In the case of Fig. 7, the sound-on-film record track is reproduced in a different ratio from that of the picture record in the course of printing or re-recording from standard 35 mm. width stock to produce a sound record track immediately adjacent the edge of the side of the film unperforated by sprocket holes.

Like the 35 mm. width film of Fig. 5, the 16 mm. width film of Figs. 6 and 7 contains images which are arranged and which may be characterized in the same manner.

It is, of course, to be understood that modifications may be made in the optical system herein described as a preferred embodiment of the invention, and likewise variations may be made in and with respect to the various steps of my improved method, all without departing from the spirit and scope of the invention.

I claim:

1. A motion picture camera apparatus utilizing standard motion picture film for natural color cinematography of objects in an object field of substantial depth comprising, a delineator for limiting the object field; an anterior diverging lens having an object plane and a predetermined plane conjugate, adapted to form a virtual image of the entirety of said delineated portion of the object field; a plurality of like converging lenses of equal focal length arranged in coplanar relationship and disposed to the rear of said anterior diverging lens, each of said lenses being adapted to take up the virtual image, and said lenses together producing a plurality of separate groups of rays, each group consisting of rays initially reflected from the said delineated portion of the object field but appearing to emanate from the said virtual image; a chromatic filter associated with each of said plurality of converging lenses; and a posterior converging lens optically common to all of said plurality of coplanar lenses adapted to concurrently converge all of the rays of the chromatically filtered separate groups of rays, to form a plurality of separate juxtaposed non-overlapping geometrically similar monochromatic real images in a common plane which includes the sensitized surface of the film; whereby each of said real images has substantial depth of definition and parallax is substantially minimized within said depth of definition.

2. An optical system for tri-color cinematography having a common axis of symmetry and comprising, an anterior negative lens, the axis of which coincides with said common axis; a trefoil of like positive lenses, each having a like certain converging power, symmetrically disposed in coplanar relationship in the rear of said negative lens and about said common axis, with their respective axes mutually equidistant and parallel to said common axis; and a posterior positive lens in the rear of said trefoil positives, the axis of which coincides with said common axis, said posterior positive lens having a converging power of the order of that of the said trefoil positive lenses; the said posterior positive lens together with each of the trefoil positive lenses forming a converging lens combination.

3. A motion picture camera apparatus and optical system for natural color cinematography with standard 35 mm. width motion picture film comprising, a delineator for limiting the object field; an anterior negative lens having a plane of the object field and a predetermined plane conjugate, adapted to form a virtual image of the entirety of said delineated portion of the object field; a trefoil of like positive lenses, each having a like certain converging power, symmetrically arranged in the rear of said negative lens in coplanar relationship with their axes mutually equidistant and parallel; said negative lens being of sufficiently short focal length so that when focused on the nearest plane of the object field the virtual image formed thereby is compressed axially to such an extent that the several planes of the object field appear in substantially like relation and without visible parallax within the depth of field of the system; a selective chromatic filter associated with each of said trefoil positive lenses; and a posterior positive lens arranged closely adjacent the plane of the posterior surfaces of the trefoil positive lenses, and having a converging power of the order of that of the said positive lenses; said posterior positive lens together with each of the trefoil positive lenses forming a converging lens combination; said converging lens combination being adapted to form three separate monochromatic real images of the virtual image in juxtaposed non-overlapping relation within the limited dimensions of a standard single frame of the said motion picture film in the image plane of the camera which includes the sensitized surface of the film; whereby each of the real images have substantial depth of definition and parallax in substantially minimized within said depth of definition.

4. An optical system for multi-color cinematography comprising, an anterior negative lens adapted to form a virtual image of the object field; a plurality of like positive lenses, each having a like certain converging power arranged in the rear of the said negative lens in coplanar relationship; said negative lens having a sufficiently short focal length so that when focused on the nearest plane of the object field the virtual image formed thereby is compressed axially to such an extent that the several planes of the object field appear in substantially like relation and without visible parallax within the depth of field of the system; and a posterior positive lens arranged closely adjacent the plane of the posterior surfaces of the said plurality of positive lenses, and having a converging power of the order of that of the said plurality of like positive lenses; said posterior positive lens together with each of the said plurality of like positive lenses forming a converging lens combination characterized by having the said virtual image formed by the negative lens in its object plane, the object distance thereof greater than the focal length of the negative lens, its magnifying power in conjunction with said negative lens rendering images in its image plane of a portion of the object field for various angles up to the order of 40°, and the focal length of the combination short enough to permit of sufficient luminosity of the system to efficiently function with film speeds at least of the order of from 16 to 24 frames per second.

5. A motion picture camera apparatus and optical system for multi-color cinematography with continuous film, of objects in an object field of substantial depth comprising, a delineator for limiting the object field; a front objective lens adapted to form an image of the entirety of said delineated portion of the object field; a plurality of like positive lenses of like converging power, symmetrically disposed in coplanar relationship in the rear of said objective and about its axis, with their respective axes mutually equidistant and parallel to the axis of the said objective; each of said plurality of positive lenses being adapted to take up said image and together produce a plurality of separate groups of rays, each group consisting of rays initially reflected from the object field; a chromatic filter associated with each of said plurality of positive lenses; a posterior positive lens in the rear of said plurality of positive lenses, the axis of which coincides with the axis of said front objective, the said posterior lens, with each of the plurality of positive lenses, forming a converging lens combination; a picture aperture plate adapted to outline a frame area of fixed dimensions upon exposure, on the sensitized surface of the film; said optical system including the front objective, the plurality of positives, the posterior positive, and the delineator, adapted to form at the image plane of the camera, which includes the sensitized surface of the film, a plurality of separate juxtaposed non-overlapping geometrically similar monochromatic real images of the object field, within the area of said film frame, as outlined by the picture aperture; said axis common to both the front objective and the posterior objective lens so arranged that the center of symmetry of the plurality of separate real images is eccentrically located with respect to the geometric center of the film frame, outlined by the aperture of the said picture aperture plate.

6. In an optical system for multi-color cinematography of objects in an object field of substantial depth, including an anterior negative lens adapted to form a virtual image of the object field, and a plurality of postive objectives of like comparatively long focal length arranged in coplanar relationship to the rear of said negative lens, adapted to take up said virtual image for simultaneously photographing the same; means for substantially avoiding visible parallax while retaining the equivalent converging effect of a comparatively short focal length for said objectives, comprising, a posterior positive lens arranged to the rear of said objectives and optically common thereto for separately, independently and simultaneously adding converging power to that of each of said objectives, said posterior positive providing a converging power so that the depth of object field without visible parallax is sufficient for the depth of field for definition.

7. In an optical system for multi-color cinematography of objects in an object field of substantial depth which includes an anterior negative lens adapted to form a virtual image of the object field, a plurality of like positive lenses arranged in coplanar relationship to the rear of the negative lens and adapted to take up the virtual image, a posterior positive lens optically common to said plurality of positive lenses arranged to the rear thereof, and adapted to add converging power independently and separately to each of said plurality of positive lenses respectively, said plurality of positive lenses and said posterior positive lens being maintained continuously in a certin fixed optical relationship; means for providing several equivalent focal lengths for said system without disturbing the said fixed optical relationship which comprises different anterior negative lenses of varied focal length.

MERRILL WAIDE.